United States Patent
Shieh

(10) Patent No.: US 9,423,038 B1
(45) Date of Patent: Aug. 23, 2016

(54) SWITCHING VALVE STRUCTURE FOR A FAUCET

(71) Applicant: HORNG LAI INDUSTRIAL CO., LTD., Chang Hua Hsien (TW)

(72) Inventor: Ming-Dang Shieh, Chang Hua Hsien (TW)

(73) Assignee: Horng Lai Industrial Co., Ltd., Chang Hua Hsien (TW)

( * ) Notice: Subject to any disclaimer, the term of this patent is extended or adjusted under 35 U.S.C. 154(b) by 0 days.

(21) Appl. No.: 14/705,145

(22) Filed: May 6, 2015

(51) Int. Cl.
| | |
|---|---|
| F16K 11/06 | (2006.01) |
| F16K 11/078 | (2006.01) |
| F16K 11/074 | (2006.01) |
| E03C 1/04 | (2006.01) |
| E03C 1/02 | (2006.01) |

(52) U.S. Cl.
CPC .............. *F16K 11/074* (2013.01); *E03C 1/04* (2013.01); *E03C 1/0404* (2013.01); *E03C 2001/026* (2013.01); *Y10T 137/6014* (2015.04); *Y10T 137/86549* (2015.04)

(58) Field of Classification Search
CPC ........ F16K 11/074; E03C 1/04; E03C 1/0404
See application file for complete search history.

(56) References Cited

U.S. PATENT DOCUMENTS

| | | | | | |
|---|---|---|---|---|---|
| 2,953,165 | A | * | 9/1960 | Reynolds | ............ F16K 27/0263 137/625.4 |
| 4,688,277 | A | * | 8/1987 | Kakinoki | ................ E03C 1/057 4/302 |
| 4,782,853 | A | * | 11/1988 | Moen | .................... F16K 11/078 137/454.6 |
| 5,397,099 | A | * | 3/1995 | Pilolla | ....................... E03C 1/04 251/129.03 |
| 5,595,216 | A | * | 1/1997 | Pilolla | ....................... E03C 1/04 137/607 |
| 5,701,926 | A | * | 12/1997 | Luisi | ........................ E03C 1/04 137/218 |
| 5,960,490 | A | * | 10/1999 | Pitsch | ...................... E03C 1/04 137/359 |

\* cited by examiner

*Primary Examiner* — Craig Schneider
*Assistant Examiner* — Kevin Barss
(74) *Attorney, Agent, or Firm* — Alan D. Kamrath; Kamrath IP Lawfirm, P.A.

(57) ABSTRACT

A switching structure for a faucet contain: a body, a stopping sleeve, a switch valve, and a rotatable control knob. The body includes a cold-water inlet, a hot-water inlet, a chamber, an outlet pipe, and an outlet connector. The chamber has a first opening and a second opening. The stopping sleeve includes a first hole, a second hole, a first close washer with a first aperture, a second close washer with a second aperture, a first face, and a second face. Between the switch valve and the body is defined a limiting structure to limit a rotation of the switch valve, the switch valve includes a channel, a coupling stem, a first vent, and a second vent. The first close washer has a first seal ring, and the second close washer has a second seal ring. The rotatable control knob is joined with the coupling stem of the switch valve.

4 Claims, 9 Drawing Sheets

SWITCHING VALVE STRUCTURE FOR A FAUCET

BACKGROUND OF THE INVENTION

1. Field of the Invention

The present invention relates to a faucet structure, and more particularly to a switching valve structure for a faucet which contains a first opening and a second opening.

2. Description of the Prior Art

A conventional faucet contains a single opening or two openings, wherein when the conventional faucet contains the single opening, it is fixed on a washbasin or in other places, and when the conventional faucet contains two openings, it is in connection with an outlet pipe and contains a switch valve to switch water supply.

A conventional switching structure for a faucet contains a body and a control lever. The body has a chamber for accommodating the switch valve which is joined with the control lever. The body also has a first opening for flowing water directly and a second opening for connecting with outlet equipment, such as a showerhead or a spray gun, such that the control lever is rotated to drive the switch valve, and then the switch valve switches water to flow out of the first opening or the second opening. To accommodate the switch valve in the chamber tightly, a tapper angle is arranged between the switch valve and the chamber, but the switch valve and the chamber are produced difficulty at a high cost. In addition, the switch valve cannot match with the chamber tightly thus leaking water.

The present invention has arisen to mitigate and/or obviate the afore-described disadvantages.

SUMMARY OF THE INVENTION

The primary objective of the present invention is to provide a switching structure for a faucet which contains a stopping sleeve fitted in the chamber of the body, and the stopping sleeve accommodates a switch valve, such that the stopping sleeve and the switch valve are connected with a body securely, and the body, the stopping sleeve and the switch valve are manufactured easily at a low cost. Preferably, the switch valve and the stopping sleeve are connected tightly to avoid a water leakage.

To obtain above-mentioned objective, a switching structure for a faucet provided by the present invention contains: a body, a stopping sleeve, a switch valve, and a rotatable control knob.

The body includes a cold-water inlet and a hot-water inlet which are disposed on two sides of the body, a chamber defined between the cold-water inlet and the hot-water inlet, an outlet pipe connected with the body, and an outlet connector for connecting with outlet equipment. A bottom end of the chamber is in communication with the cold-water inlet and the hot-water inlet, the chamber has a first opening defined on an inner wall thereof to communicate with the outlet pipe, and the chamber has a second opening for communicating with the outlet connector.

The stopping sleeve is hollow and is fitted in the chamber of the body, and the stopping sleeve includes a first hole corresponding to the first opening and includes a second hole corresponding to the second opening, the stopping sleeve also includes a first close washer and a second close washer which are fitted on an outer wall of the stopping sleeve to stop a water leakage, and the stopping sleeve further includes a first face formed on an outer wall thereof and includes a second face arranged on the outer wall thereof, wherein a first close washer is fitted on the first face and a second close washer is fitted on the second face, and the first close washer and the second close washer are formed in an arcuate sheet shape, the first close washer has a first aperture defined on a central position thereof and aligning and communicating with the first hole of the stopping sleeve, and the second close washer has a second aperture defined on a central position thereof and aligning and communicating with the second hole of the stopping sleeve, such that the first hole of the stopping sleeve is in communication with the first opening of the body via the first aperture of the first close washer, and the second hole of the stopping sleeve is in communication with the second opening of the body via the second aperture of the second close washer.

The switch valve inserts into and rotates in the stopping sleeve, between the switch valve and the body is defined a limiting structure to limit a rotation of the switch valve within a certain angle. The switch valve includes a channel defined on the first end thereof corresponding to the bottom end of the chamber and communicating with the cold-water inlet and the hot-water inlet, the switch valve also includes a coupling stem extending outwardly from a second end thereof away from the bottom end of the chamber and extending out of the body, a first vent and a second vent being in communication with the channel. The first close washer of the stopping sleeve has a first seal ring arranged on an inner wall thereof to surround around the first aperture and fitted with the first hole of the stopping sleeve to extend into a first part of the stopping sleeve, and the second close washer has a second seal ring arranged on an inner wall thereof to surround around the second aperture and fitted with the second hole of the stopping sleeve to extend into a second part of the stopping sleeve.

The rotatable control knob is joined with the coupling stem of the switch valve to drive the switch valve to rotate, thus switching water to flow out of the first opening or the second opening of the body.

BRIEF DESCRIPTION OF THE DRAWINGS

FIG. 2A is a perspective view showing the assembly of a stopping sleeve of the switching structure for the faucet in accordance with the preferred embodiment of the present invention.

DETAILED DESCRIPTION OF THE PREFERRED EMBODIMENTS

Figure 1:
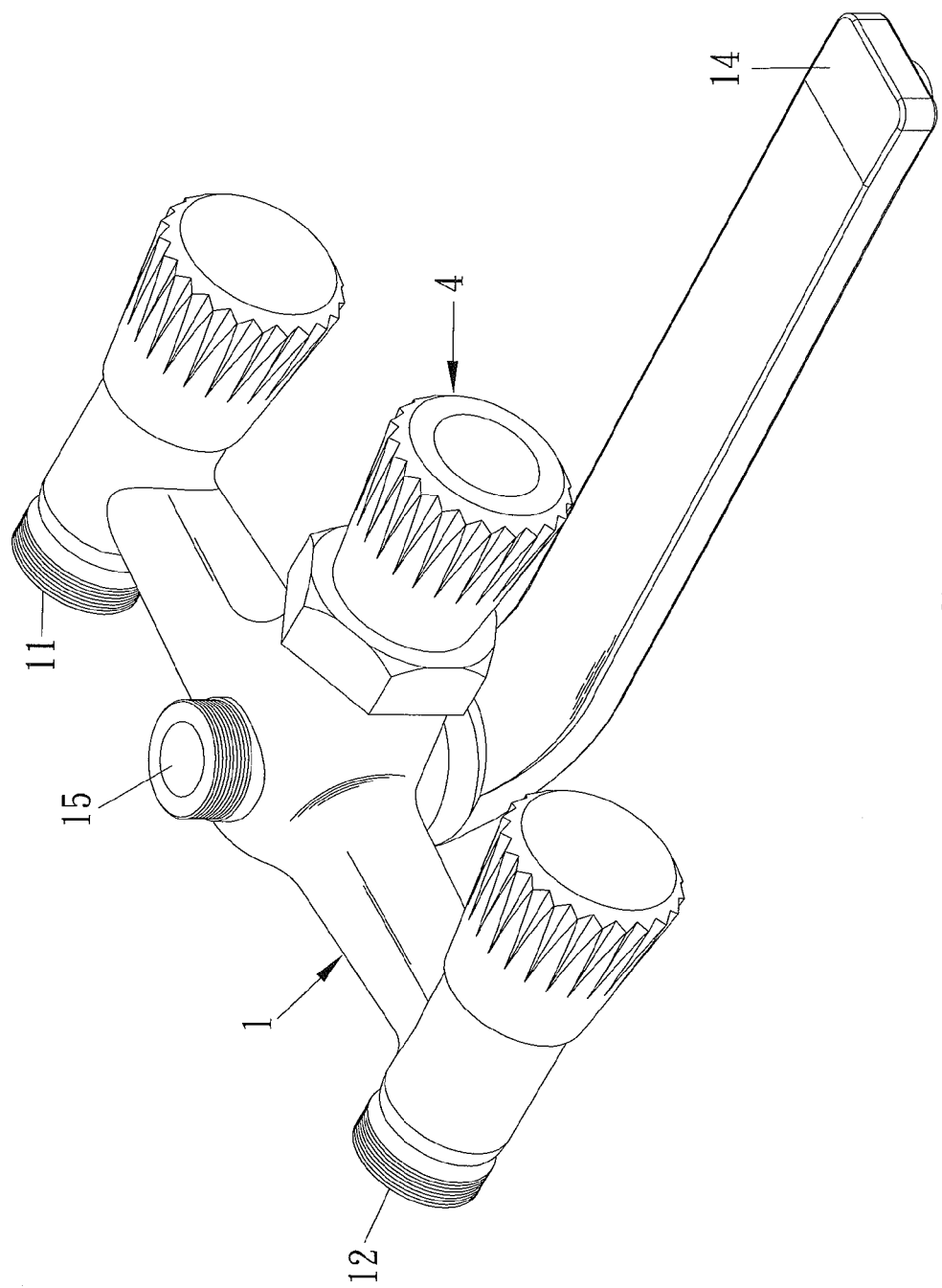
FIG. 1 is a perspective view showing the assembly of a switching structure for a faucet in accordance with a preferred embodiment of the present invention.
Figure 2:
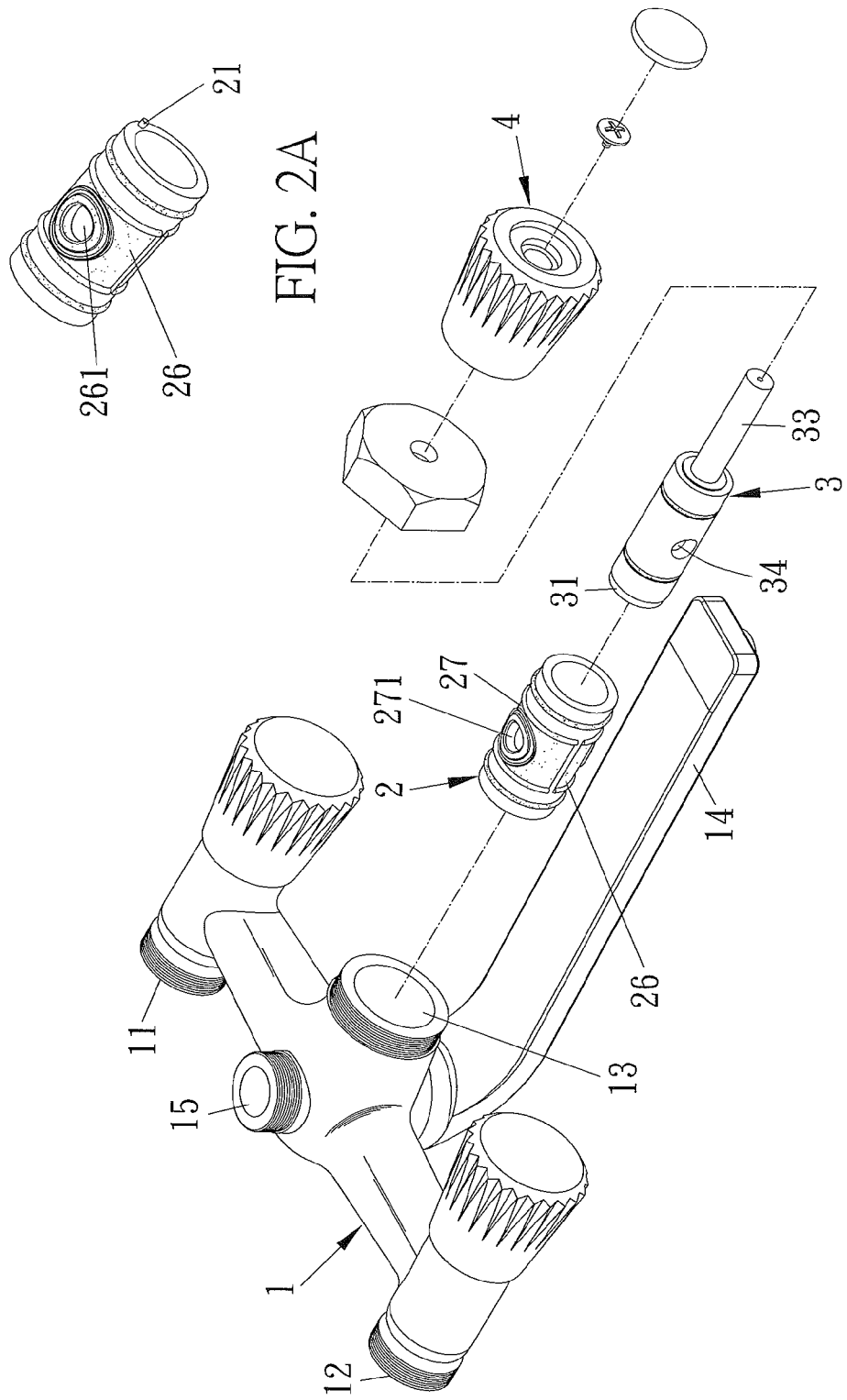
FIG. 2 is a perspective view showing the exploded components of the switching structure for the faucet in accordance with the preferred embodiment of the present invention.
Figure 3:
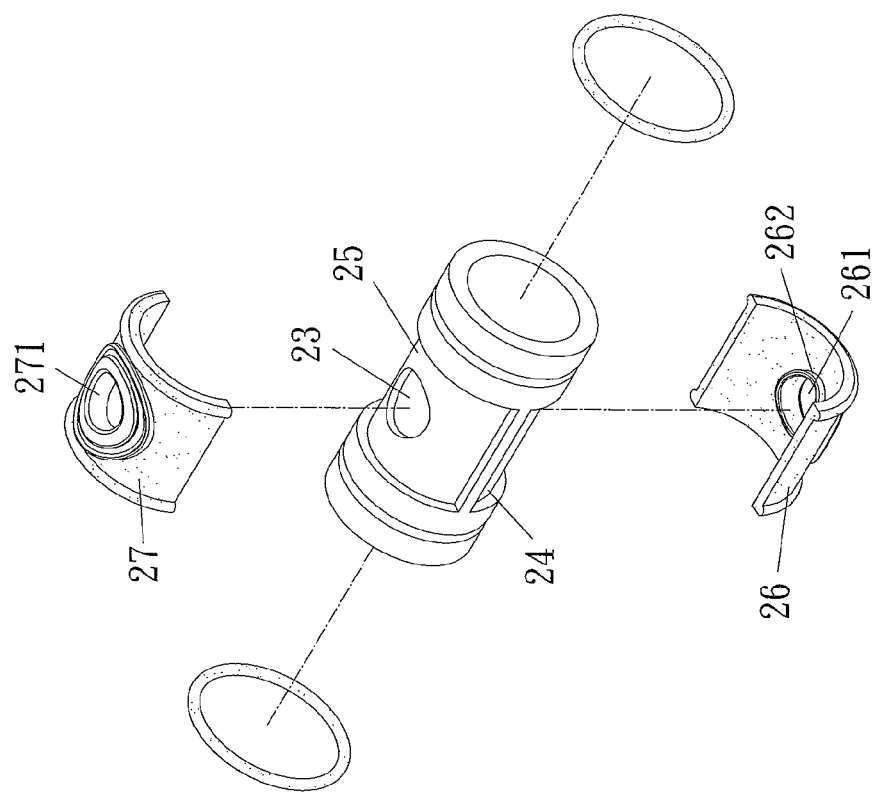
FIG. 3 is a perspective view showing the exploded components of the stopping sleeve of the switching structure for the faucet in accordance with the preferred embodiment of the present invention.
Figure 4:
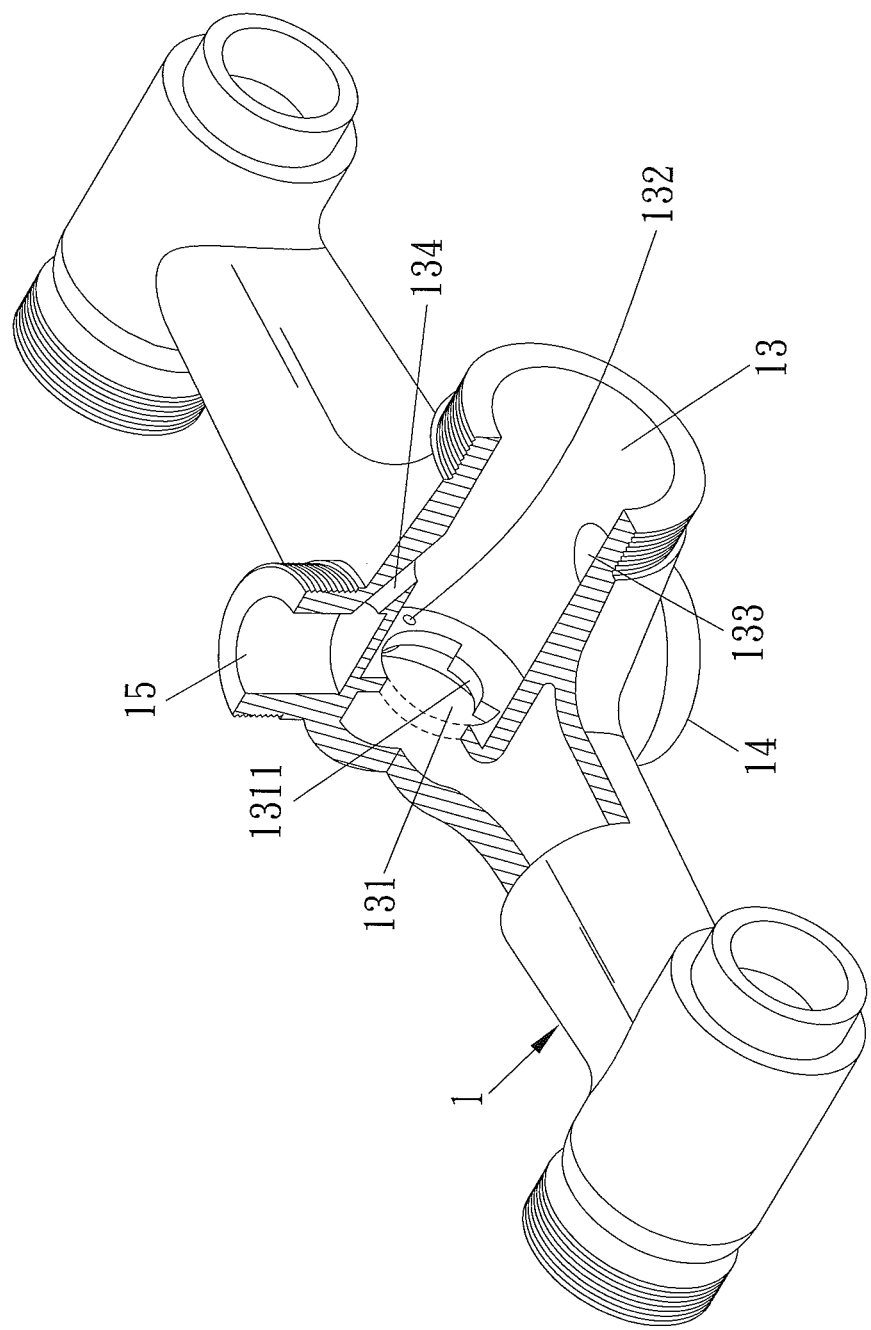
FIG. 4 is a cross-sectional perspective view showing the assembly of a part of a body of the switching structure for the faucet in accordance with the preferred embodiment of the present invention.
Figure 5:
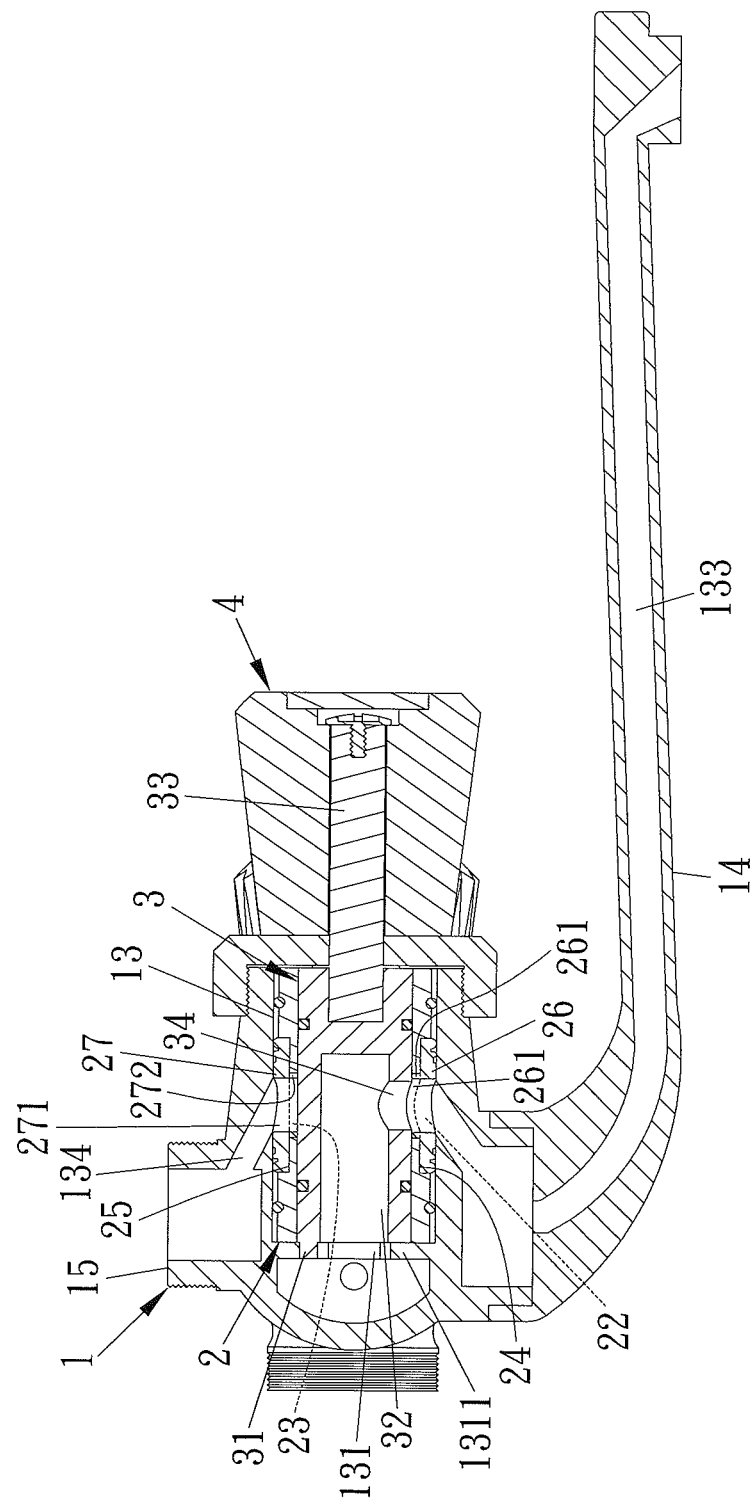
FIG. 5 is a cross sectional view showing the assembly of the switching structure for the faucet in accordance with the preferred embodiment of the present invention.
Figure 6:
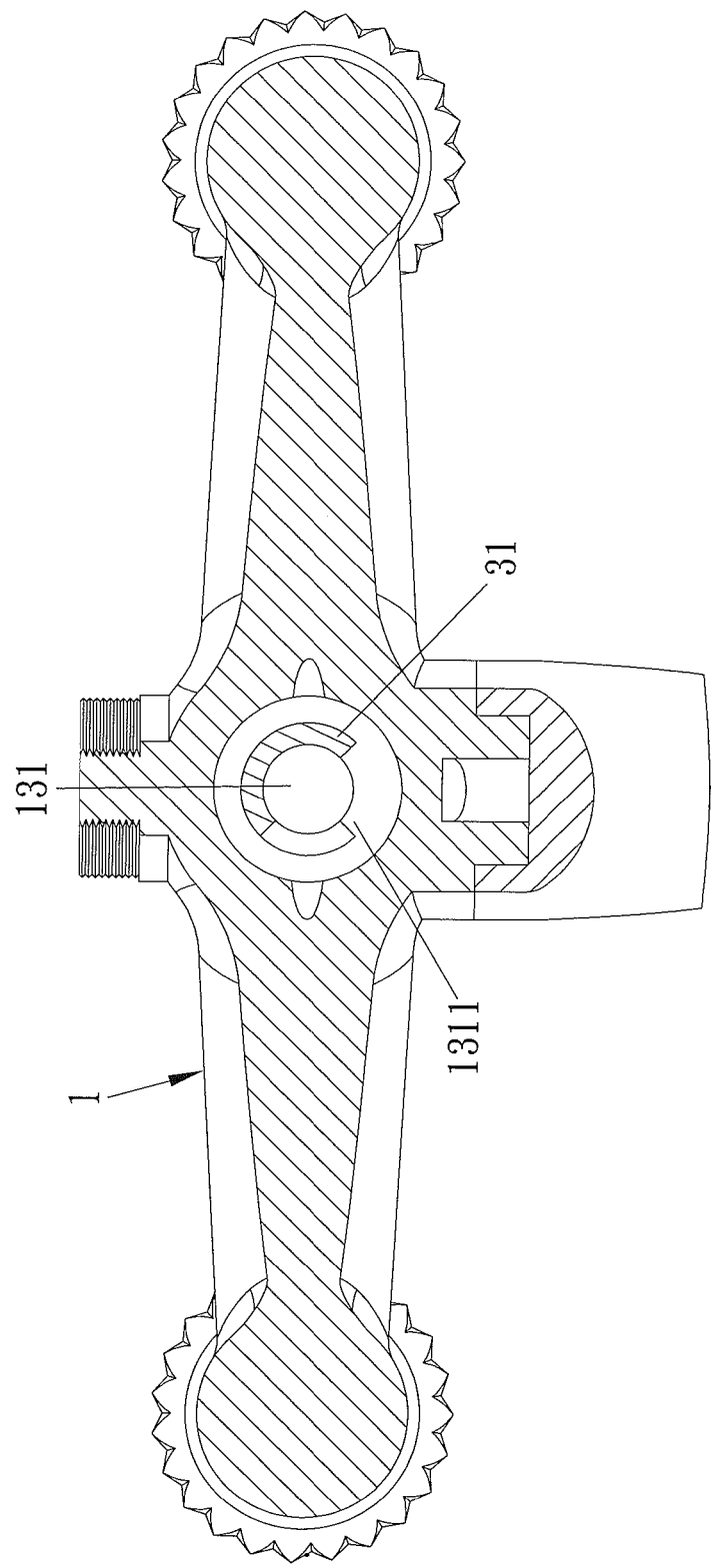
FIG. 6 is another cross sectional view showing the assembly of the switching structure for the faucet in accordance with the preferred embodiment of the present invention.

The present invention will be clearer from the following description when viewed together with the accompanying drawings, which show, for purpose of illustrations only, the preferred embodiment in accordance with the present invention.

Referring to FIGS. 1-6, a switching structure for a faucet according to a preferred embodiment of the present invention comprises: a body 1, a stopping sleeve 2, a switch valve 3, and a rotatable control knob 4, wherein the body 1 includes a cold-water inlet 11 and a hot-water inlet 12 which are disposed on two sides of the body 1, a chamber 13 defined between the cold-water inlet 11 and the hot-water inlet 12, an outlet pipe 14 connected with the body 1, and an outlet connector 15 for connecting with outlet equipment, such as a showerhead or a spray gun. The chamber 13 has a circular intake 131 defined on a bottom end thereof and has a positioning orifice 132 adjacent to the circular intake 131, wherein the circular intake 131 is in communication with the cold-water inlet 11 and the hot-water inlet 12. The chamber 13 further has a first opening 133 defined on an inner wall thereof to communicate with the outlet pipe 14 and has a second opening 134 for communicating with the outlet connector 15. The stopping sleeve 2 is hollow and is made of hard plastic material, and the stopping sleeve 2 is fitted in the chamber 13 of the body 1 and includes a fixing post 21 extending outwardly from one end thereof to abut against the bottom end of the chamber 13 and to insert into the positioning orifice 132 of the chamber 13, hence the stopping sleeve 2 does not rotate in the chamber 13. The stopping sleeve 2 also includes a first hole 22 corresponding to the first opening 133 and includes a second hole 23 corresponding to the second opening 134. The stopping sleeve 2 further includes a first face 24 formed on an outer wall thereof to surround around the first hole 22 and includes a second face 25 arranged on the outer wall thereof to surround around the second hole 23, wherein a first close washer 26 is fitted on the first face 24 and a second close washer 27 is fitted on the second face 25 to stop a water leakage, and the first close washer 26 and the second close washer 27 are made of rubber material and are formed in an arcuate sheet shape. The first close washer 26 has a first aperture 261 defined on a central position thereof and has a first seal ring 262 arranged on an inner wall thereof to surround around the first aperture 261, and the second close washer 27 has a second aperture 271 formed on a central position thereof and has a second seal ring 272 arranged on an inner wall thereof to surround around the second aperture 271, wherein the first aperture 261 aligns and communicates with the first hole 22 of the stopping sleeve 2, and the second aperture 271 aligns and communicates with the second hole 23 of the stopping sleeve 2, such that the first hole 22 of the stopping sleeve 2 is in communication with the first opening 133 of the body 1 via the first aperture 261 of the first close washer 26, and the second hole 23 of the stopping sleeve 2 is in communication with the second opening 134 of the body 1 via the second aperture 271 of the second close washer 27, the first seal ring 262 of the first close washer 26 is fitted with the first hole 22 of the stopping sleeve 2 to extend into a first part of the stopping sleeve 2, and the second seal ring 272 of the second close washer 27 is fitted with the second hole 23 of the stopping sleeve 2 to extend into a second part of the stopping sleeve 2. The switch valve 3 is formed in a circular column shape and inserts into the stopping sleeve 2 to tightly contact with the first seal ring 262 of the first close washer 26 and the second seal ring 272 of the second close washer 27, and the switch valve 3 rotates in the stopping sleeve 2. Between the switch valve 3 and the body 1 is defined a limiting structure, and the limiting structure contains a shoulder 1311 arranged around the circular intake 131 on the bottom end of the chamber 13 of the body 1. The limiting structure also contains an affix projection 31 formed on a first end of the switch valve 3 corresponding to the bottom end of the chamber 13 and inserted into the circular intake 131 on the bottom end of the chamber 13, such that the affix projection 31 cooperates with the shoulder 1311 of the circular intake 131, thus limiting a rotation of the switch valve 3 within a certain angle. In addition, the switch valve 3 further includes a channel 32 defined on the first end thereof corresponding to the bottom end of the chamber 13 and communicating with the cold-water inlet 11 and the hot-water inlet 12 through the circular intake 131 of the body 1. The switch valve 3 further includes a coupling stem 33 extending outwardly from a second end thereof away from the bottom end of the chamber 13 and extending out of the body 1, a first vent 34 and a second vent 35 between which an angle of 90 degrees is defined, wherein the first vent 34 and the second vent 35 are in communication with the channel 32, and the rotatable control knob 4 is joined with the switch valve 3 by using at least one locking element.

Figure 7:
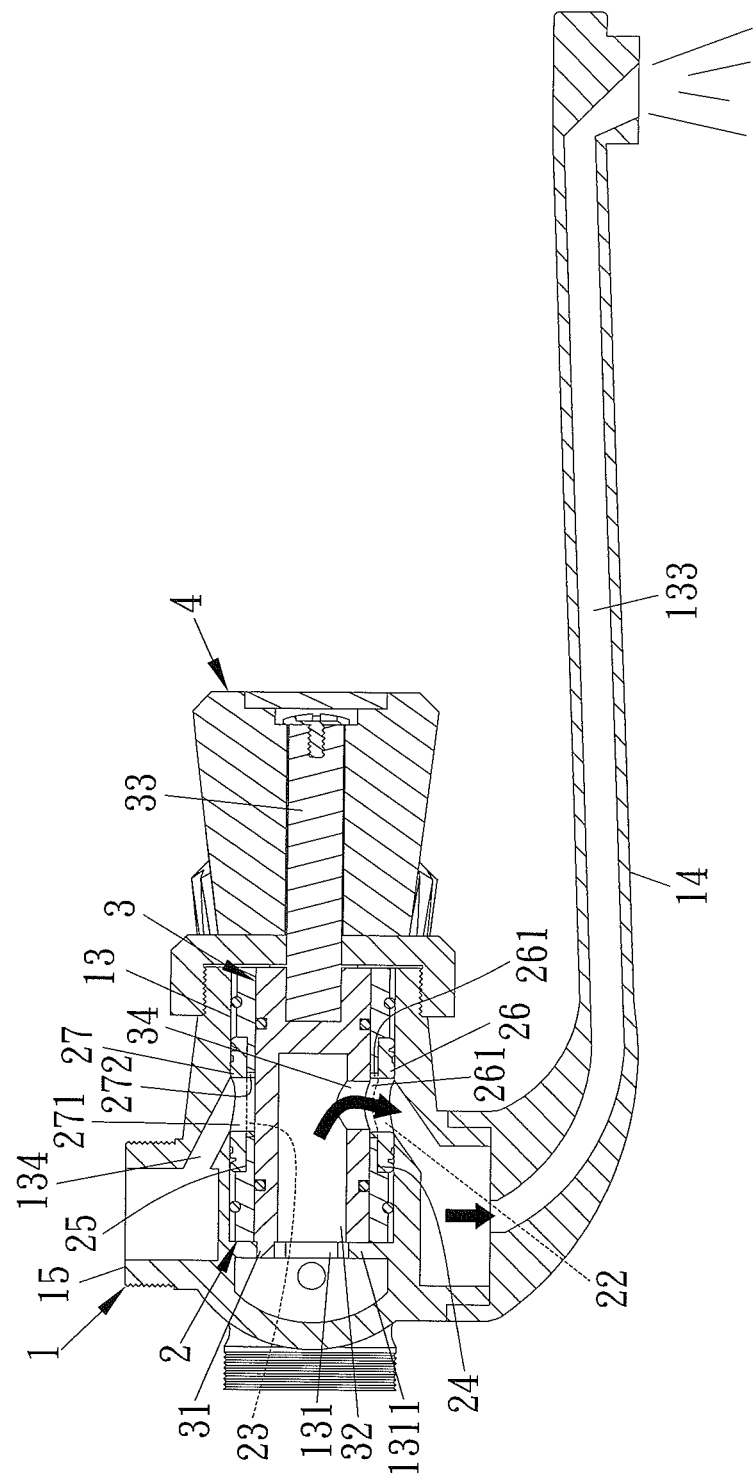
FIG. 7 is a cross sectional view showing the operation of the switching structure for the faucet in accordance with the preferred embodiment of the present invention.

As desiring to flow water out of the outlet pipe 14 of the body 1, as shown in FIG. 7, the rotatable control knob 4 is rotated forward to a front end of the body 1, and the affix projection 31 of the switch valve 3 abuts against a first side of the shoulder 1311 of the circular intake 131 of the body 1, the first vent 3 of the switch valve 3 is in communication with the first opening 133 of the body 1 through the first hole 22 of the stopping sleeve 2 and the first aperture 261 of the first close washer 26, such that a cold water and a hot water flow into the channel 32 of the switch valve 3 from the cold-water inlet 11 and the hot-water inlet 12 of the body 1 through the circular intake 131 of the chamber 13, and then the cold water and the hot water flow out of the outlet pipe 14 from the first vent 34 of the switch valve 3 via the first hole 22 of the stopping sleeve 2, the first aperture 261 of the first close washer 26, and the first opening 133 of the body 1.

Figure 8:
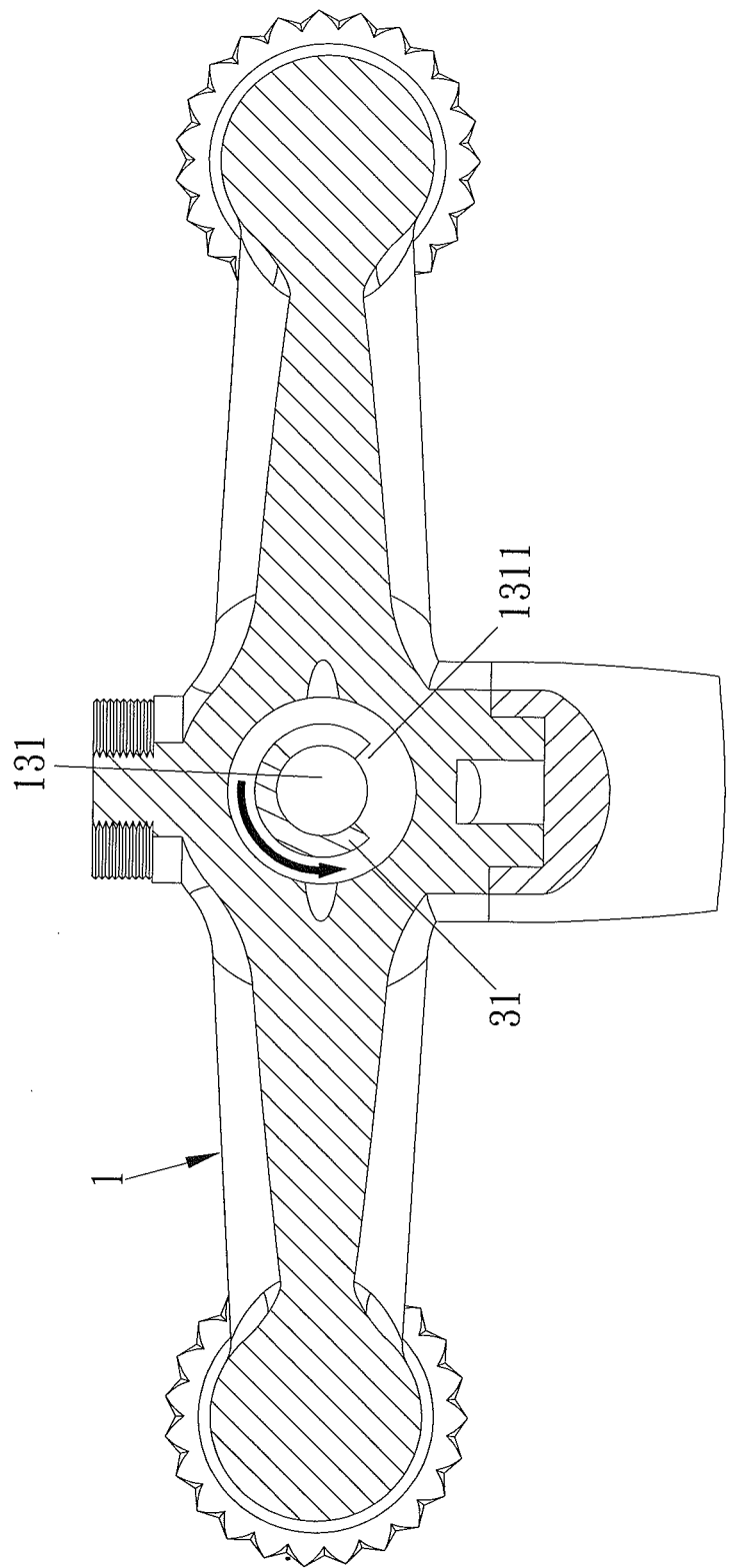
FIG. 8 is another cross sectional view showing the operation of the switching structure for the faucet in accordance with the preferred embodiment of the present invention.
Figure 9:
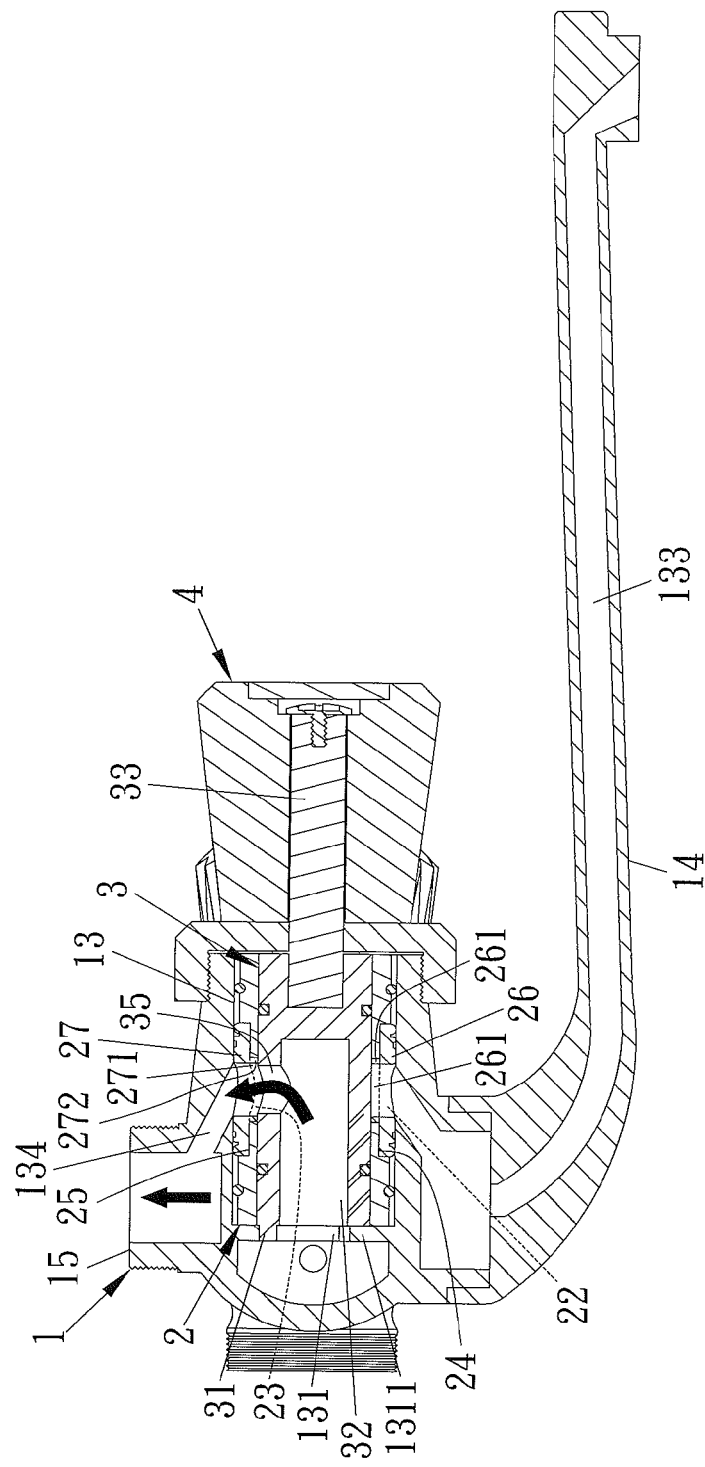
FIG. 9 is also another cross sectional view showing the operation of the switching structure for the faucet in accordance with the preferred embodiment of the present invention.

As desiring to flow the water out of the outlet equipment which is joined with the second opening 134 of the body 1, as illustrated in FIGS. 8 and 9, the rotatable control knob 4 is rotated toward one of the two sides of the body 1, and then the affix projection 31 of the switch valve 3 abuts against a second side of the shoulder 1311 of the circular intake 131 of the body 1, in the meantime, the second vent 35 of the switch valve 3 communicates with the second opening 134 of the body 1 through the second hole 23 of the stopping sleeve 2 and the second aperture 271 of the second close washer 27, hence the cold water and the hot water flow into the channel 32 of the switch valve 3 from the cold-water inlet 11 and the hot-water inlet 12 of the body 1 via the circular intake 131 of the chamber 13, and then the cold water and the hot water flow out of the outlet equipment from the second vent 35 of the switch valve 3 through the second hole 23 of the stopping sleeve 2, the second aperture 271 of the second close washer 27, the second opening 134 of the body 1, and the outlet connector 15.

The switching structure of the present invention has advantages as follows:

the stopping sleeve 2 is fitted in the chamber 13 of the body 1, and the stopping sleeve 2 accommodates the switch valve 3, such that the stopping sleeve 2 and the switch valve 3 are connected with the body 1 securely, and the body 1, the stopping sleeve 2, and the switch valve 3 are manufactured easily at a low cost. Preferably, the switch valve 3 and the stopping sleeve 2 are connected tightly to avoid the water leakage.

While we have shown and described various embodiments in accordance with the present invention, it is clear to those skilled in the art that further embodiments may be made without departing from the scope of the present invention.

What is claimed is:

1. A switching structure for a faucet comprising:
a body including a cold-water inlet and a hot-water inlet which are disposed on two sides of the body, a chamber defined between the cold-water inlet and the hot-water inlet, an outlet pipe connected with the body, and an outlet connector for connecting with outlet equipment; a bottom end of the chamber being in communication with the cold-water inlet and the hot-water inlet, the chamber having a first opening defined on an inner wall thereof to communicate with the outlet pipe, and the chamber having a second opening for communicating with the outlet connector;
a stopping sleeve being hollow and fitted in the chamber of the body, and the stopping sleeve including a first hole corresponding to the first opening and including a second hole corresponding to the second opening, the stopping sleeve further including a first close washer and a second close washer which are fitted on an outer wall of the stopping sleeve to stop a water leakage, and the stopping sleeve further including a first face formed on an outer wall thereof and including a second face arranged on the outer wall thereof, wherein a first close washer is fitted on the first face and a second close washer is fitted on the second face, and the first close washer and the second close washer are formed in an arcuate sheet shape, the first close washer has a first aperture defined on a central position thereof and aligning and communicating with the first hole of the stopping sleeve, and the second close washer has a second aperture defined on a central position thereof and aligning and communicating with the second hole of the stopping sleeve, such that the first hole of the stopping sleeve is in communication with the first opening of the body via the first aperture of the first close washer, and the second hole of the stopping sleeve is in communication with the second opening of the body via the second aperture of the second close washer;
a switch valve inserting into and rotating in the stopping sleeve, between the switch valve and the body being defined a limiting structure to limit a rotation of the switch valve within a certain angle, the switch valve including a channel defined on the first end thereof corresponding to the bottom end of the chamber and communicating with the cold-water inlet and the hot-water inlet, the switch valve also including a coupling stem extending outwardly from a second end thereof away from the bottom end of the chamber and extending out of the body, a first vent and a second vent being in communication with the channel; the first close washer of the stopping sleeve having a first seal ring arranged on an inner wall thereof to surround around the first aperture and fitted with the first hole of the stopping sleeve to extend into a first part of the stopping sleeve, and the second close washer having a second seal ring arranged on an inner wall thereof to surround around the second aperture and fitted with the second hole of the stopping sleeve to extend into a second part of the stopping sleeve;
a rotatable control knob joined with the coupling stem of the switch valve to drive the switch valve to rotate, thus switching water to flow out of the first opening or the second opening of the body.

2. The switching structure for the faucet as claimed in claim 1, wherein the stopping sleeve is fixed in the chamber of the body, and the chamber has a positioning orifice defined on the bottom end thereof adjacent to the circular intake, the stopping sleeve further includes a fixing post extending outwardly from one end thereof to abut against the bottom end of the chamber and to insert into the positioning orifice of the chamber, thus fixing the stopping sleeve in the chamber.

3. The switching structure for the faucet as claimed in claim 1, wherein the limiting structure contains a shoulder arranged around the circular intake on the bottom end of the chamber of the body, the limiting structure also contains an affix projection formed on a first end of the switch valve corresponding to the bottom end of the chamber and inserted into the circular intake on the bottom end of the chamber, such that the affix projection cooperates with the shoulder of the circular intake, and when the switch valve is rotated, the affix projection retains with the shoulder of the body, thus liming a rotation of the switch valve within an angle.

4. The switching structure for the faucet as claimed in claim 1, wherein an angle between a first vent and a second vent is 90 degrees.

* * * * *